United States Patent
Matsumoto

(10) Patent No.: US 9,998,618 B2
(45) Date of Patent: Jun. 12, 2018

(54) REMOTE OPERATION DEVICE, REMOTE OPERATION METHOD, AND NON-TRANSITORY COMPUTER-READABLE RECORDING MEDIUM ENCODED WITH REMOTE OPERATION PROGRAM

(71) Applicant: Konica Minolta, Inc., Tokyo (JP)

(72) Inventor: Yukinori Matsumoto, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/464,862

(22) Filed: Mar. 21, 2017

(65) Prior Publication Data

US 2017/0289372 A1    Oct. 5, 2017

(30) Foreign Application Priority Data

Mar. 31, 2016    (JP) .................. 2016-071395

(51) Int. Cl.
*H04N 1/00* (2006.01)

(52) U.S. Cl.
CPC ..... *H04N 1/00493* (2013.01); *H04N 1/00307* (2013.01); *H04N 1/00411* (2013.01); *H04N 2201/0075* (2013.01); *H04N 2201/0094* (2013.01)

(58) Field of Classification Search
CPC ................ H04N 1/00493; H04N 1/00307
See application file for complete search history.

(56) References Cited

U.S. PATENT DOCUMENTS

| 8,412,267 B2* | 4/2013 | Miyata .................... H04W 4/00 455/556.1 |
| 8,498,816 B2* | 7/2013 | Miyamoto ........... G01C 21/365 701/400 |
| 8,942,694 B2* | 1/2015 | Woo ....................... G08C 17/02 455/420 |

FOREIGN PATENT DOCUMENTS

JP    2013183215 A    9/2013

* cited by examiner

*Primary Examiner* — Ibrahim Siddo
(74) *Attorney, Agent, or Firm* — Lucas & Mercanti, LLP

(57) ABSTRACT

A remote operation device capable of remotely operating an image processing apparatus includes a display, an operation acceptor that accepts an operation by a user, and a hardware processor, wherein the hardware processor displays any of a plurality of operation screens in the display, detects a position relative to the image processing apparatus, stores an operation state indicating an operation accepted by the operation acceptor in a current state before the current state is switched to a non-current state, based on a position detected after activation at which the non-current state is switched to the current state and an operation state last stored, determines an activation screen, and, in response to the non-current state being switched to the current state, displays the activation screen determined in the display.

15 Claims, 11 Drawing Sheets

| AT THE TIME OF OPERATION | | AT THE TIME OF ACTIVATION | |
|---|---|---|---|
| OPERATION | POSITION | POSITION | ACTIVATION SCREEN |
| NO OPERATION | — | CLOSE | SCAN SETTING SCREEN |
| | — | FAR | DOCUMENT SELECTION SCREEN |
| OPERATION OTHER THAN EXECUTION INSTRUCTION OPERATION | FAR | CLOSE | SCAN SETTING SCREEN |
| | CLOSE | CLOSE | SCAN SETTING SCREEN |
| | FAR | FAR | DOCUMENT SELECTION SCREEN |
| | CLOSE | FAR | DOCUMENT SELECTION SCREEN |
| EXECUTION INSTRUCTION OPERATION | FAR | CLOSE | STATUS NOTIFICATION SCREEN |
| | CLOSE | CLOSE | SCAN SETTING SCREEN |
| | FAR | FAR | STATUS NOTIFICATION SCREEN |
| | CLOSE | FAR | DOCUMENT SELECTION SCREEN |

F I G. 6

| POSITION | ACTIVATION SCREEN |
|---|---|
| CLOSE | SCAN SETTING SCREEN |
| FAR | DOCUMENT SELECTION SCREEN |

F I G. 7

| AT THE TIME OF OPERATION | | AT THE TIME OF ACTIVATION | |
|---|---|---|---|
| OPERATION | POSITION | POSITION | ACTIVATION SCREEN |
| NO OPERATION | — | CLOSE | SCAN SETTING SCREEN |
| | — | FAR | DOCUMENT SELECTION SCREEN |
| OPERATION OTHER THAN EXECUTION INSTRUCTION OPERATION | FAR | CLOSE | SCAN SETTING SCREEN |
| | CLOSE | CLOSE | SCAN SETTING SCREEN |
| | FAR | FAR | DOCUMENT SELECTION SCREEN |
| | CLOSE | FAR | DOCUMENT SELECTION SCREEN |
| EXECUTION INSTRUCTION OPERATION | FAR | CLOSE | STATUS NOTIFICATION SCREEN |
| | CLOSE | CLOSE | SCAN SETTING SCREEN |
| | FAR | FAR | STATUS NOTIFICATION SCREEN |
| | CLOSE | FAR | DOCUMENT SELECTION SCREEN |

F I G. 1 1

| AT THE TIME OF OPERATION | | AT THE TIME OF ACTIVATION | |
|---|---|---|---|
| OPERATION | POSITION | POSITION | ACTIVATION SCREEN |
| NO OPERATION | — | CLOSE | SCAN SETTING SCREEN |
| | — | FAR | DOCUMENT SELECTION SCREEN |
| OPERATION OTHER THAN EXECUTION INSTRUCTION OPERATION | FAR | CLOSE | SCAN SETTING SCREEN |
| | CLOSE | CLOSE | SCAN SETTING SCREEN |
| | FAR | FAR | DOCUMENT SELECTION SCREEN |
| | CLOSE | FAR | DOCUMENT SELECTION SCREEN |
| EXECUTION INSTRUCTION OPERATION (REMOTELY CONDUCTED OPERATION) | FAR | CLOSE | STATUS NOTIFICATION SCREEN |
| | CLOSE | CLOSE | SCAN SETTING SCREEN |
| | FAR | FAR | STATUS NOTIFICATION SCREEN |
| | CLOSE | FAR | DOCUMENT SELECTION SCREEN |
| EXECUTION INSTRUCTION OPERATION (CLOSELY CONDUCTED OPERATION) | CLOSE | CLOSE | SCAN SETTING SCREEN |
| | CLOSE | FAR | STATUS NOTIFICATION SCREEN |

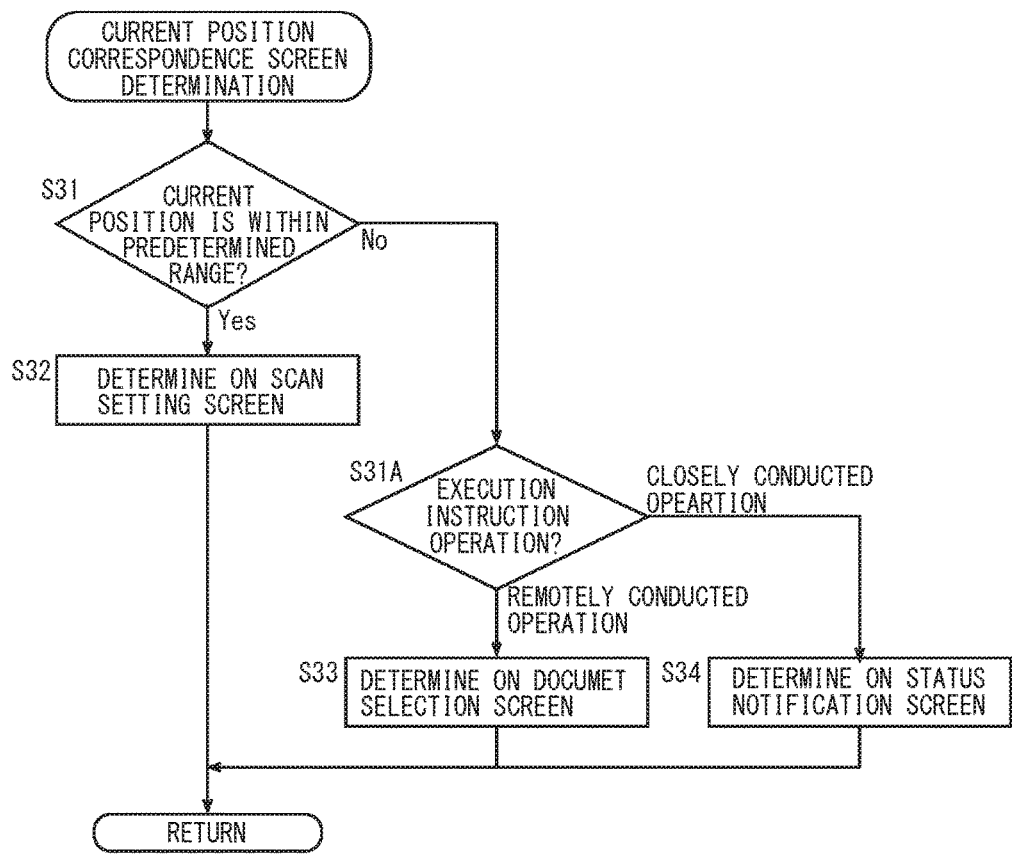
F I G. 1 2

REMOTE OPERATION DEVICE, REMOTE OPERATION METHOD, AND NON-TRANSITORY COMPUTER-READABLE RECORDING MEDIUM ENCODED WITH REMOTE OPERATION PROGRAM

This application is based on Japanese Patent Application No. 2016-071395 filed with Japan Patent Office on Mar. 31, 2016, the entire content of which is hereby incorporated by reference.

BACKGROUND OF THE INVENTION

Field of the Invention

The present invention relates to a remote operation device, a remote operation method and a non-transitory computer-readable recording medium encoded with a remote operation program. In particular, the present invention relates to a remote operation device capable of remotely operating an image processing apparatus, a remote operation method performed in the remote operation device and a non-transitory computer-readable recording medium encoded with a remote operation program.

Description of the Related Art

In recent years, a technology for remotely operating an image processing apparatus such as an MFP (Multi Function Peripheral) with a portable information device such as a smartphone and a PDA (Personal Digital Assistant) carried by a user is known.

For example, Japanese Patent Laid-Open No. 2013-183215 discloses a remote operation system in which a local operation of the MFP remotely operated by the portable information device is limited to the case where the portable information device is positioned within a predetermined range from the MFP. In this manner, in the case where the MFP is remotely operated by the portable information device, the local operation of the MFP cannot be performed unless a user is near the MFP. On the other hand, if a remotely conducted operation is other than the local operation, the MFP can perform the operation even if the user is not near the MFP.

However, in the case where an application program for remotely operating the MFP by the portable information device is executed, a screen to be initially displayed is likely to be a predetermined initial screen. Therefore, in the case where the application program for remotely operating the MFP by the portable information device is executed, the initial screen is displayed regardless of a distance from the MFP. Thus, the user must change the screen to a screen in which the MFP can be operated, and the operation is cumbersome.

SUMMARY OF THE INVENTION

According to one aspect of the present invention, a remote operation device capable of remotely operating an image processing apparatus includes a display that displays an image, an operation acceptor that accepts an operation by a user, and a hardware processor, wherein the hardware processor includes an operation screen display configured to display any of a plurality of operation screens in the display, a detector configured to detect a position relative to the image processing apparatus, an operation state storage configured to store an operation state indicating an operation accepted by the operation acceptor in a current state before the current state is switched to a non-current state, and an activation screen determiner configured to, based on a position detected by the detector after activation at which the non-current state is switched to the current state and an operation state last stored by the operation state storage, determine an activation screen from among the plurality of operation screens, wherein the operation screen display is configured to, in response to the non-current state being switched to the current state, display the activation screen determined by the activation screen determiner in the display.

According to another aspect of the present invention, a remote operation method performed by a remote operation device, the remote operation device including a display that displays the image, and an operation acceptor that accepts an operation by a user, the remote operation method including an operation screen display step of displaying any of a plurality of operation screens in the display, a detection step of detecting a position relative to the image processing apparatus, an operation state storage step of storing an operation state indicating an operation accepted by the operation acceptor in a current state before the current state is switched to a non-current state, and an activation screen determination step of, based on a position detected in the detection step after activation at which the non-current state is switched to the current state and an operation state last stored in the operation state storage step, determining an activation screen from among the plurality of operation screens, wherein the operation screen display step includes a step of, in response to the non-current state being switched to the current state, displaying the activation screen determined in the activation screen determination step in the display.

According to yet another aspect of the present invention, a non-transitory computer-readable recording medium encoded with a remote operation program, a remote operation device including a display that displays an image, and an operation acceptor that accepts an operation by a user, the remote operation program causing a computer that controls the remote operation device to execute an operation screen display step of displaying any of a plurality of operation screens in the display, a detection step of detecting a position relative to the image processing apparatus, an operation state storage step of storing an operation state indicating an operation accepted by the operation acceptor in a current state before the current state is switched to a non-current state, and an activation screen determination step of, based on a position detected in the detection step after activation at which the non-current state is switched to the current state and an operation state last stored in the operation state storage step, determining an activation screen from among the plurality of operation screens, wherein the operation screen display step includes a step of, in response to the non-current state being switched to the current state, displaying the activation screen determined in the activation screen determination step in the display.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 6 is a diagram showing one example of a screen table;

FIG. 7 is a diagram showing one example of a relationship among operations, distances from the MFP and activation screens;

FIG. 11 is a diagram showing one example of a relationship among operations, distances from the MFP and activation screens in a modified example; and FIG. 12 is a flow chart showing one example of a flow of a current position determination process in the modified example.

DESCRIPTION OF THE PREFERRED EMBODIMENTS

Figure 1:
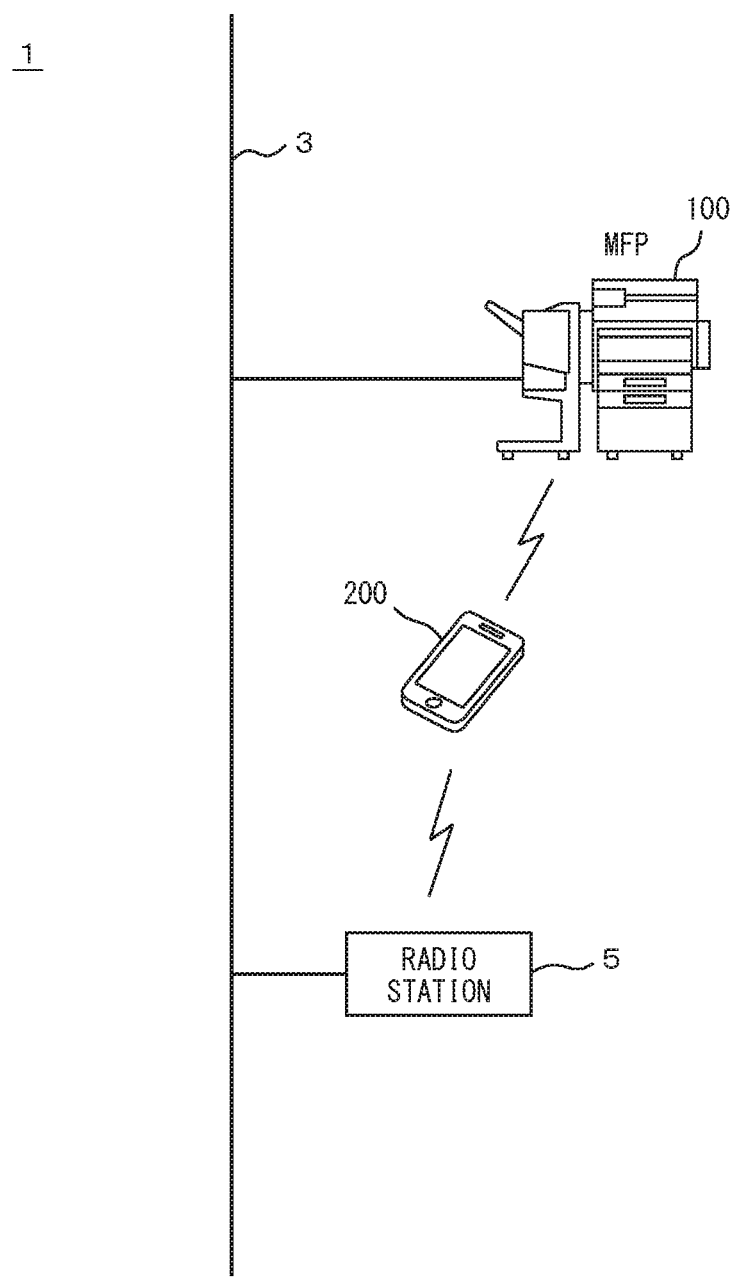
FIG. 1 is a diagram showing one example of an overview of a remote control system in an embodiment of the present invention.

Embodiments of the present invention will be described below with reference to the drawings. In the following description, the same parts are denoted with the same reference characters. Their names and functions are also the same. Thus, a detailed description thereof will not be repeated.

FIG. 1 is a diagram showing one example of an overview of a remote control system in embodiments of the present invention. Referring to FIG. 1, the remote control system 1 includes an MFP (Multi Function Peripheral) 100 and a smartphone 200.

The smartphone 200 is one example of a portable information device, and is carried and used by a user. The MFP 100 is one example of an image processing apparatus, and includes a document scanning function for scanning a document, an image forming function for forming an image on a recording medium such as a sheet of paper based on image data and a facsimile transmission reception function for transmitting and receiving facsimile data.

Each of a radio station 5 and the MFP 100 is connected to a network 3. The network 3 is a Local Area Network (LAN), either wired or wireless. Further, the network 3 is not limited to the LAN and may be a network that uses a Public Switched Telephone Network, or the like. Further, the network 3 may be a Wide Area Network (WAN) such as the Internet.

The smartphone 200 has a wireless LAN function and can communicate with the radio station 5. The radio station 5 is a relay device of the network 3, communicates with the smartphone 200 including a communication function using a wireless LAN and connects the smartphone 200 to the network 3. Therefore, the smartphone 200 can communicate with the MFP 100 via the radio station 5. The network 3 may further be connected to the Internet. In this case, each of the smartphone 200 and the MFP 100 can communicate with a computer connected to the Internet via the network 3.

Further, each of the MFP 100 and the smartphone 200 has a short-range wireless communication function and can perform one-to-one communication with each other in the case where the other device is within a predetermined range.

In the remote control system 1 in the present embodiment, the smartphone 200 can remotely control the MFP 100. A remote operation program for remotely operating the MFP 100 is installed in the smartphone 200. On the other hand, a remote control program for being remotely operated by the smartphone 200 is installed in the MFP 100. Thus, the smartphone 200 functions as a remote operation device that remotely operates the MFP 100, and the MFP 100 functions as a remote control device that is remotely operated by the smartphone 200. The smartphone 200 is described as one example of the remote operation device that remotely operates the MFP 100. However, the remote operation device may be a PDA (Personal Digital Assistant) or the like as long as it is the portable information device that can be carried by the user.

Figure 2:
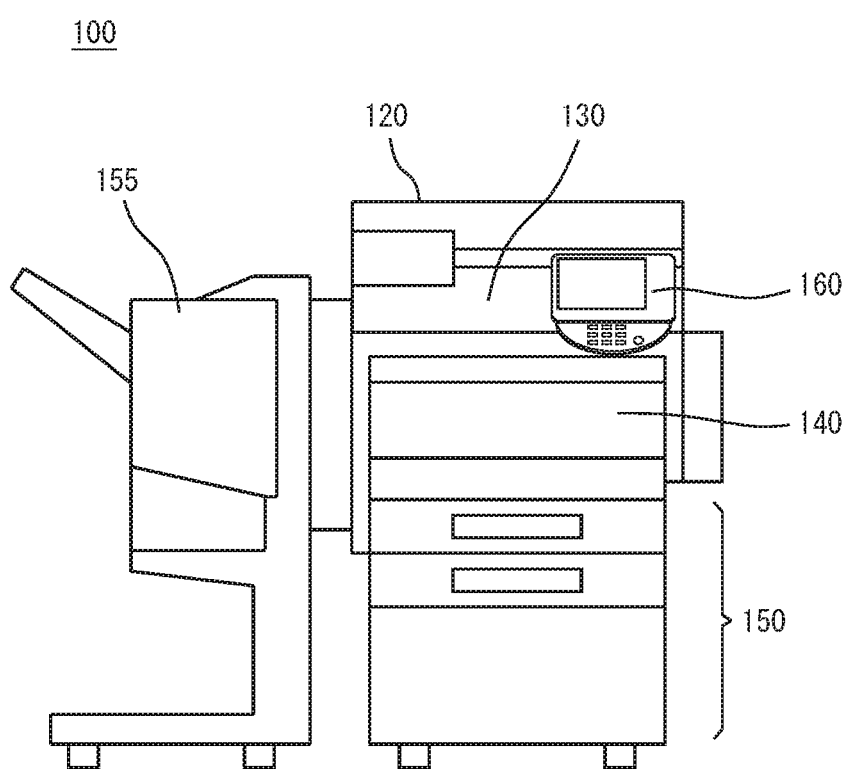
FIG. 2 is a perspective view showing the appearance of an MFP in the present embodiment.
Figure 3:
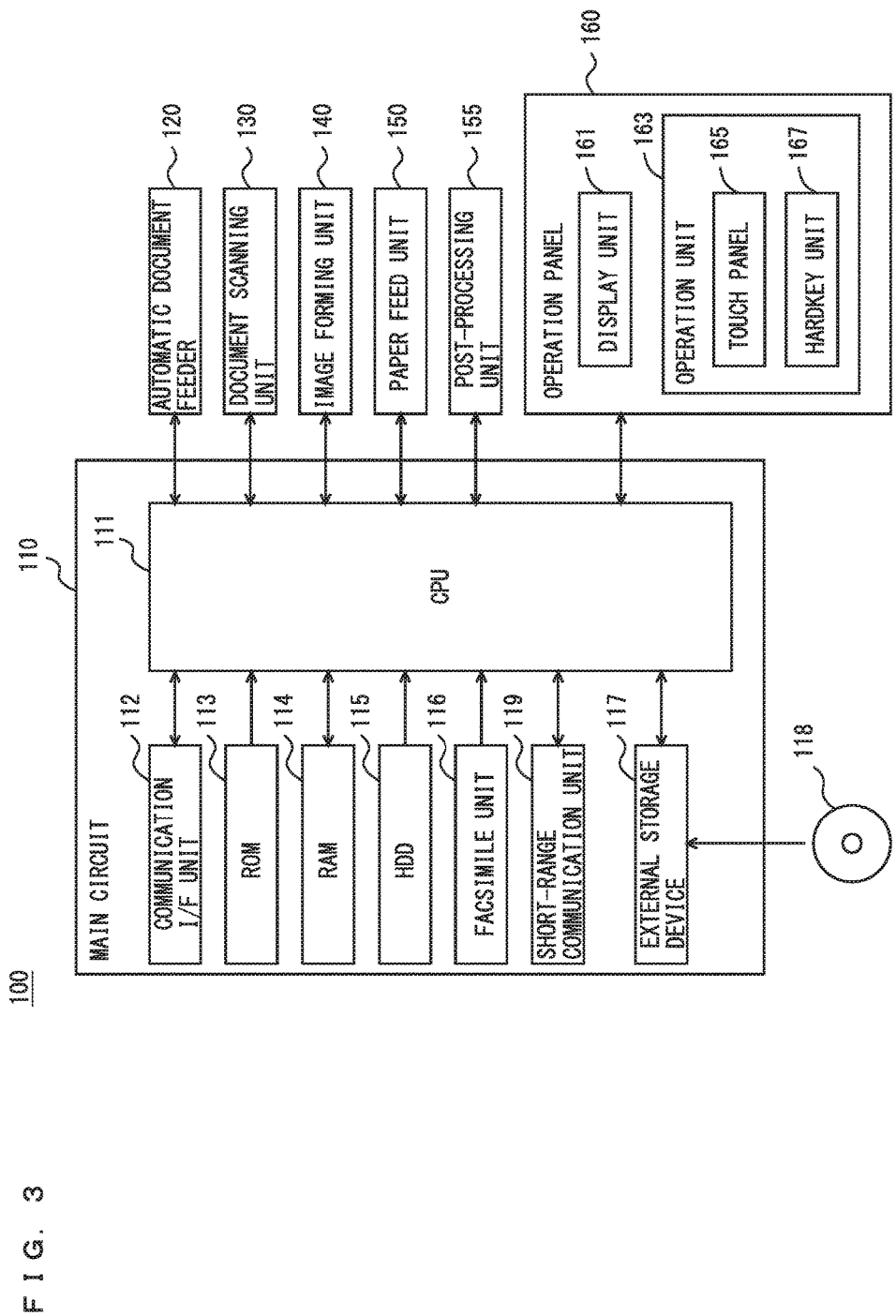
FIG. 3 is a block diagram showing one example of a hardware configuration of the MFP in the present embodiment.

FIG. 2 is an external perspective view showing the appearance of the MFP in the present embodiment. FIG. 3 is a block diagram showing one example of a hardware configuration of the MFP in the present embodiment. Referring to FIGS. 2 and 3, the MFP 100 includes a main circuit 110, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140, a post-processing unit 155 for processing sheets of paper on which images have been formed and an operation panel 160 serving as a user interface.

The post-processing unit 155 performs a sorting process of sorting and discharging one or more sheets of paper on which images have been formed by the image forming unit 140, a hole-punching process of punching the sheets and a stapling process of stapling the sheets.

The main circuit 110 includes a CPU 111, a communication interface (I/F) unit 112, a ROM 113, a RAM 114, a hard disk drive (HDD) 115 as a mass storage device, a facsimile unit 116, and an external storage device 117 on which a CD-ROM 118 is mounted and a short-range communication unit 119. The CPU 111 is connected to the automatic document feeder 120, the document scanning unit 130, the image forming unit 140, the paper feed unit 150, the post-processing unit 155 and the operation panel 160, and controls the entire MFP 100.

The ROM 113 stores a program executed by the CPU 111 or data necessary for execution of the program. The RAM 114 is used as a work area when the CPU 111 executes a program. Further, the RAM 114 temporarily stores scan data (image data) successively transmitted from the document scanning unit 130.

The operation panel 160 is provided on an upper surface of the MFP 100 and includes a display unit 161 and an operation unit 163. The display unit 161 is a display device such as a liquid crystal display (LCD) or an organic ELD (Electro-Luminescence Display), and displays an instruction menu for the user, information about acquired image data and others. The operation unit 163 includes a hard key unit 167 including a plurality of keys and accepts input of a variety of instructions and data such as characters and numerals by an operation of the user corresponding to the keys. The operation unit 163 further includes a touch panel 165 provided on the display unit 161.

The communication I/F unit 112 is an interface for connecting the MFP 100 to the network 3. The CPU 111 communicates with the smartphone 200 via the communication I/F unit 112 for transmitting and receiving data. Further, the communication I/F unit 112 can communicate with a computer connected to the Internet via the network 3.

The short-range communication unit 119 wirelessly communicates with the smartphone 200 on the basis of a GAP (Generic Access Profile) of the Bluetooth (registered trademark) standards, or the like. When a distance from the smartphone 200 is a communicable distance or less, for example, the short-range communication unit 119 communicates with the smartphone 200. The communicable distance for the short-range communication unit 119 is several meters. Further, the short-range communication unit 119 may communicate through a short-range wireless communication system called NFC (Close Field Communication). In this case, the communicable distance for the short-range communication unit 119 is several tens of centimeters.

The facsimile unit 116 is connected to the public switched telephone networks (PSTN) and transmits facsimile data to or receives facsimile data from the PSTN. The facsimile unit 116 stores the received facsimile data in the HDD 115 or outputs the data to the image forming unit 140. The image forming unit 140 prints the facsimile data received by the facsimile unit 116 on a sheet of paper. Further, the facsimile unit 116 converts the data stored in the HDD 115 into facsimile data, and transmits the facsimile data to a facsimile machine connected to the PSTN.

The external storage device 117 is mounted with the CD-ROM 118. The CPU 111 is capable of accessing the CD-ROM 118 via the external storage device 117. The CPU 111 loads a program, recorded in the CD-ROM 118 that is mounted on the external storage device 117, into the RAM 114 for execution. It is noted that the medium for storing the program executed by the CPU 111 is not limited to the CD-ROM 118. It may be an optical disc (MO (Magnetic Optical Disc)/MD (Mini Disc)/DVD (Digital Versatile Disc)), an IC card, an optical card, and a semiconductor memory such as a mask ROM, an EPROM (Erasable Programmable ROM) and an EEPROM (Electrically EPROM).

Further, the program executed by the CPU 111 is not limited to the program recorded in the CD-ROM 118, and CPU 111 may load a program, stored in the HDD 115, into RAM 114 for execution. In this case, another computer connected to the network 3 may rewrite the program stored in the HDD 115 of the MFP 100, or may additionally write a new program therein. Further, the MFP 100 may download a program from another computer connected to the network 3, and store the program in the HDD 115. The program referred to here includes not only a program directly executable by the CPU 111 but also a source program, a compressed program, an encrypted program or the like.

Figure 4:
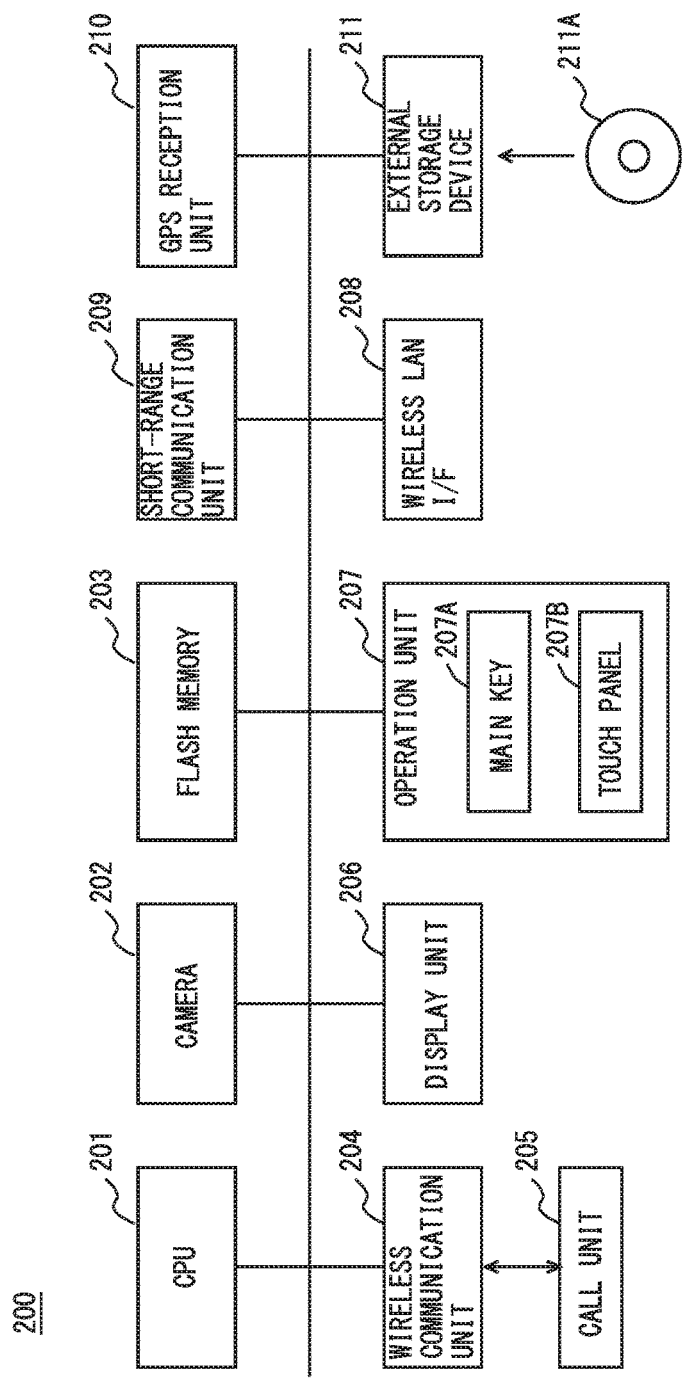
FIG. 4 is a block diagram showing an outline of a hardware configuration of a smartphone in the present embodiment.

FIG. 4 a block diagram showing an outline of a hardware configuration of the smartphone in the present embodiment. Referring to FIG. 4, the smartphone 200 in the present embodiment includes a CPU 201 for controlling the entire smartphone 200, a camera 202, a flash memory 203 that stores data in a nonvolatile manner, a wireless communication unit 204 that is connected to a call unit 205, a display unit 206 that displays information, an operation unit 207 that accepts an operation of the user, a wireless LAN I/F 208, a short-range communication unit 209, a GPS reception unit 210 and an external storage device 211.

The display unit 206 is a display device such as a Liquid Crystal Display (LCD) or an organic ELD and displays an instruction menu to the user, information about the acquired image data, and the like. The operation unit 207 includes a main key 207A and a touch panel 207B. Further, in the case where the user designates a position in the display surface of the display unit 206, the operation unit 207 outputs the position in the display surface detected by the touch panel 207B to the CPU 201. The CPU 201 detects the position designated by the user in the screen displayed in the display unit 206 based on the position detected by the touch panel 207B. The CPU 201 accepts input of a variety of instructions and data such as characters and numerals by an operation of the user based on the screen displayed in the display unit 206 and the position detected by the touch panel 207B. For example, in the case where a screen including an image of ten keys is displayed in the display unit 206, a numeral corresponding to a key displayed at the position detected by the touch panel 207B is accepted.

The camera 202 includes a lens and a photoelectric transducer, light collected by the lens is imaged on the photoelectric transducer, and the photoelectric transducer photoelectrically converts the received light into image data for output to the CPU 201. The photoelectric transducer may be a CMOS (Complementary Metal Oxide Semiconductor) sensor, a CCD (Charge Coupled Device) sensor or the like.

The radio communication unit 204 communicates by radio with the mobile phone base station connected to a telephone communication network. The radio communication unit 204 connects the smartphone 200 to the telephone communication network to enable a call with the call unit 205. The radio communication unit 204 decodes a voice signal obtained by demodulating a radio signal received from the mobile phone base station and outputs the decoded signal to the call unit 205. Further, the radio communication unit 204 encodes voice input from the call unit 205 and transmits the encoded signal to the mobile phone base station. The call unit 205 includes a microphone and a speaker. The voice input from the radio communication unit 204 is output from the speaker, and the voice input from the microphone is output to the radio communication unit 204. Further, the radio communication unit 204 is controlled by the CPU 201 and connects the smartphone 200 to an email server to transmit and receive emails.

The wireless LAN I/F 208 is an interface for communicating with the radio station 5 to connect the smartphone 200 to the network 3. An IP (Internet Protocol) address of the MFP 100 is registered in the smartphone 200, so that the smartphone 200 can communicate with the MFP 100 and transmit and receive data.

The short-range communication unit 209 wirelessly communicates with another device, for example, the MFP 100 on the basis of a GAP of the Bluetooth (registered trademark) standards or the like. When a distance from the MFP 100 is a communicable distance or less, for example, the short-range communication unit 209 communicates with the MFP 100. The communicable distance for the short-range communication unit 209 is several meters. Further, the short-range communication unit 209 may communicate through the short-range wireless communication system called NFC. In this case, the communicable distance for the short-range communication unit 209 is several tens of centimeters.

The GPS reception unit 210 receives a signal transmitted from a GPS (Global Positioning System) satellite and detects a current position based on the received signal. The current position is represented by latitude and longitude, for example. The GPS reception unit 210 outputs the detected current position to the CPU 201.

The flash memory 203 stores a program executed by the CPU 201 or data necessary for execution of the program. The CPU 201 loads the program, recorded in the flash memory 203, into a RAM included in the CPU 201 for execution.

The external storage device 211 is attachable to and detachable from the smartphone 200, and can be mounted with a CD-ROM 211A that stores the remote operation program. The CPU 201 can access the CD-ROM 211A via the external storage device 211. The CPU 201 can load the remote operation program recorded in the CD-ROM 211 mounted on the external storage device 211 into the RAM included in the CPU 201 for execution.

While the program recorded in the flash memory 203 or the CD-ROM 210A is described as the program executed by the CPU 201, it may be a program created when another computer connected to the network 3 rewrites the program stored in the flash memory 203 or additionally write a new program therein. Further, it may be a program downloaded by the smartphone 200 from another computer connected to the network 3. The program referred to here includes not only a program directly executable by the CPU 201 but also a source program, a compressed program, an encrypted program and the like.

The program executed by CPU 201 may be stored not only in the CD-ROM 211A but also in other mediums such as an optical disc (MO/MD/DVD), an IC card, an optical card, and a semiconductor memory such as a mask ROM, an EPROM and an EEPROM.

The remote operation program for remotely operating the MFP 100 is installed in the smartphone 200. The remote operation program is executed by the smartphone 200, so that the user who operates the smartphone 200 can operate the MFP 100 by operating the smartphone 200.

The smartphone 200 can remotely operate another image processing apparatus different from the MFP 100 by executing the remote operation program. In this case, the smartphone 200 determines a device designated by the user as a device to be remotely operated. The case where the MFP 100 is set in the smartphone 200 as a default device to be remotely operated will be described here as an example.

Figure 5:
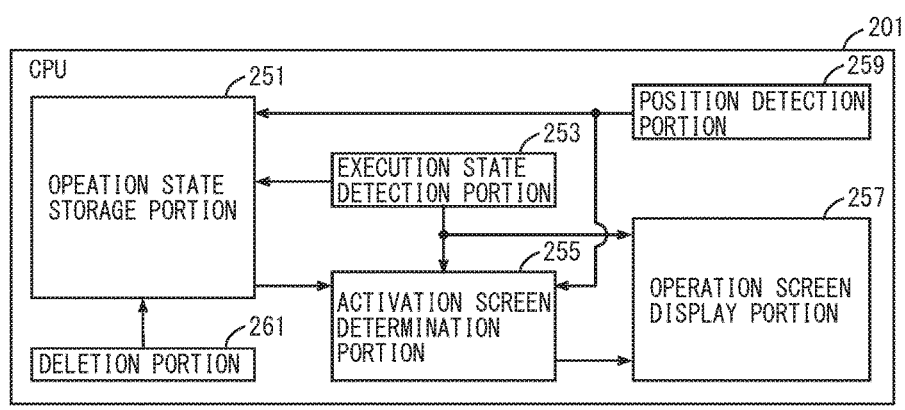
FIG. 5 is a diagram showing one example of functions of a CPU included in the smartphone in the present embodiment.

FIG. 5 is a diagram showing one example of functions of the CPU included in the smartphone in the present embodiment. The functions shown in FIG. 5 are the functions formed in the CPU 201 in the case where the CPU 201 included in the smartphone 200 executes the remote operation program stored in the flash memory 203 or the CD-ROM 211A. Hereinafter, a task for executing the remote operation program by the CPU 201 is referred to as a remote operation task.

Referring to FIG. 5, the CPU 201 includes an operation state storage portion 251 that stores operation state information indicating an operation input by the user, an execution state detection portion 253 that detects a state where the CPU 201 executes the remote operation program, an activation screen determination portion 255 that determines an activation screen, an operation screen display portion 257 that displays an operation screen in the display unit 206, a position detection portion that detects a position relative to a device to be remotely operated, and a deletion portion 261.

The execution state detection portion 253 detects an execution state of the remote operation task and outputs the detected execution state to the operation state storage portion 251 and the activation screen determination portion 255. The execution state includes a current state and a non-current state. The current state is a state where the remote operation task can allow an image to be displayed in the display unit 206, and the non-current state is a state where the remote operation task cannot allow an image to be displayed in the display unit 206.

When the user inputs an operation of giving an instruction to execute the remote operation program to the operation unit 207, the CPU 201 accepts an activation operation and executes the remote operation program. For example, the smartphone 200 is set such that, when power is applied to the smartphone 200, a menu screen including an image such as an icon associated with a command of executing the remote operation program is displayed in the display unit 206. Then, when the touch panel 207B detects designation of the icon associated with the command of executing the remote operation program, the CPU 201 accepts the activation operation of giving an instruction to execute the remote operation program and executes the remote operation program. Further, at the stage when the execution of the remote operation program is in progress, when the user inputs an operation of ending the execution of the remote operation program to the operation unit 207, the CPU 201 accepts an end instruction operation and ends the remote operation task. Further, the CPU 201 can execute an application program different from the remote operation program while executing the remote operation program. In the case where executing the application program different from the remote operation program, the CPU 201 switches an execution state of the remote operation task to any of the current state and non-current state.

At the stage when not executing the remote operation program, in the case where accepting the activation operation of the remote operation program, the CPU 201 executes the remote operation program and sets the remote operation task of executing the remote operation program to the current state. Further, in the case where the MFP 100 is not set as a device to be remotely operated, at the stage when the execution of the remote operation program is in progress, the CPU 201 communicates with the MFP 100 in response to the designation of the MFP 100 by the user. When the MFP 100 can be remotely operated, the CPU 201 sets the remote operation task to the current state. In the connection between the smartphone 200 and the MFP 100, in the case where the MFP 100 requests authentication, the CPU 201 transmits authentication information to the MFP 100. In the case where the authentication by the MFP 100 is successful, the MFP 100 can be remotely operated.

In the case where the remote operation task is in the current state, the CPU 201 switches the execution state of the remote operation task to the non-current state in response to an occurrence of an event causing the execution state of the remote operation task to be switched to the non-current state. The event causing the execution state of the remote operation task to be switched to the non-current state includes the case where the CPU 201 accepts a non-current switching operation by the user and the case where the CPU 201 switches an execution state of another task set in the non-current state to the current state. The non-current switching operation includes an operation of displaying a menu screen and an operation of temporarily ending the display in the display unit 206, for example. As for the case where the CPU 201 switches an execution state of another task set in the non-current state to the current state, the case where the CPU 201 executes a call control program for controlling the wireless communication unit 204 and controlling a call in order to enable the call function will be described as an example. In the case where a call control task of executing the call control program by the CPU 201 detects an incoming call while being set in the non-current state, the CPU 201 sets the call control task to the current state.

In the case where the remote operation task is in the non-current state, the CPU 201 switches the execution state of the remote operation task to the current state in response to an occurrence of an event causing the execution state of the remote operation task to be switched to the current state. The event causing the state of the remote operation task to be switched to the current state includes the case where the CPU 201 accepts a current switching operation by the user. For example, in the case where the remote operation task is in the non-current state, the CPU 201 accepts the current switching operation in response to detection by the touch panel 207B of designation of an icon, associated with a command of executing the remote operation program, in the menu screen displayed in the display unit 206. In the case where the touch panel 207B detects the designation of the icon associated with the command of executing the remote operation program, if a remote operation task set in the non-current state is present, the CPU 201 accepts the current switching operation. If the remote operation task is not present, the CPU 201 accepts the activation operation.

The position detection portion 259 detects a position relative to the MFP 100. The position detection portion 259 detects a distance from the MFP 100 based on the strength of radio waves, which the short-range communication unit 209 receives from the MFP 100. The position detection portion 259 detects a position in accordance with the distance from the MFP 100. If the distance from the MFP 100 is a predetermined distance or less, the position detection portion 259 determines that the position of the smartphone 200 relative to the MFP 100 is within a predetermined range from the MFP 100. If the distance from the MFP 100 is larger than the predetermined distance, the position detection portion 259 determines that the position of the smartphone 200 relative to the MFP 100 is outside of the predetermined range from the MFP 100. The position detection portion 259 outputs position information indicating the determined position to the operation state storage portion 251 and the activation screen determination portion 255. The position information includes any one of a position outside of the predetermined range from the MFP 100 and a position within the predetermined range from the MFP 100.

In the case where the distance from the MFP 100 is measured by the short-range communication unit 209, the GPS reception unit 210 is unnecessary. In the case where the MFP 100 detects the distance from the smartphone 200, the CPU 201 may control the short-range communication unit 209, request the MFP 100 to measure the distance between the smartphone 200 and the MFP 100, and receive the detected distance from the MFP 100.

Further, the position detection portion 259 may detect the distance from the MFP 100 from a position detected by the GPS reception unit 210 and a geographical position of the MFP 100 stored in advance, and may determine a position of the smartphone 200 relative to the MFP 100 from the detected position.

Further, in the case where the MFP 100 has a beacon terminal, when the position detection portion 259 receives a beacon signal transmitted from the beacon terminal, the position detection portion 259 may determine a position of the smartphone 200 relative to the MFP 100 as a position within the predetermined range from the MFP 100. When the position detection portion 259 does not receive a beacon signal transmitted from the beacon terminal, the position detection portion 259 may determine a position of the smartphone 200 relative to the MFP 100 as a position outside of the predetermined range from the MFP 100. The beacon terminal has a function of performing short-range wireless communication through a communication system using BLE (Bluetooth (registered trademark) Low Energy) standards, is assigned with unique identification information and transmits the identification information as a beacon signal. The identification information is a UUID (Universally Unique Identifier), a Major value and a Minor value, for example. The smartphone 200 can specify the MFP 100 by receiving a beacon signal of the identification information assigned to the beacon terminal of the MFP 100.

The operation state storage portion 251 accepts an operation relating to the remote operation task among operations input in the operation unit 207 by the user. Specifically, in the case where an execution state received from the execution state detection portion 253 indicates the current state, the operation state storage portion 251 accepts an operation accepted by the operation unit 207. The operation state storage portion 251 receives position information from the position detection portion 259. In response to acceptance of the operation relating to the remote operation task by the operation unit 207, the operation state storage portion 251 associates the accepted operation with the position information that is received from the position detection portion 259 at a time point at which the operation is accepted, and date and time of that time point. In response to switching of the execution state received from the execution state detection portion 253 from the current state to the non-current state, the operation state storage portion 251 associates an operation last accepted in the current state with the position information received from the position detection portion 259 and the date and time of that time point.

Specifically, the operation state storage portion 251 stores the operation identification information for identifying an operation last stored in the current state, the position information received from the position detection portion 259 at a time point at which the operation is accepted, and operation state information including the date and time of the time point at which the operation is accepted, in the flash memory 203. In the case where the operation state information is stored in the flash memory 203, the operation state storage portion 251 updates the operation state information with the new operation state information. Thus, the operation last accepted in the current state can be associated with the position information received from the position detection portion 259 and the date and time of that time point.

The operation accepted in the current state includes an operation of allowing the MFP 100 to execute an image process and an operation of allowing the MFP 100 to execute a process other than the image process. The image process executed by the MFP 100 includes a scan process of scanning a document, an image forming process of forming an image of image data on a sheet of paper, a transmission process of externally transmitting the image data and a data conversion process of converting the image data. The data conversion process of converting the image data includes a format conversion process of converting a format of the image data, an image conversion process of converting an image of the image data and a character identification process of identifying characters in an image of the image data. The image conversion process includes a process of converting the color of an image, a smoothing process of smoothing an edge of an image, an edge enhancement process of enhancing an edge of an image, a binarization process of binarizing a pixel value and an encoding process of compressing the image data.

In the case where accepting an operation of giving an instruction to execute any of the scan process, the image forming process, the transmission process and the data conversion process, the operation state storage portion 251 stores an execution instruction operation of giving an instruction to execute each of the processes. Further, because a copying process of scanning a document and forming an image of the document on a sheet of paper is a combination of the scan process and the image forming process, the operation state storage portion 251 stores an operation of giving an instruction to execute each of the scan process and the image forming process. Further, because a process of transmitting image data, acquired when a document is scanned, by facsimile is a combination of the scan process and the transmission process, the operation state storage portion 251 stores an operation of giving an instruction to execute each of the scan process and the transmission process.

The process other than the image process executed by the MFP 100 includes a process of displaying a status notification screen for making notification of a state of a process in progress, a state of a process that has ended, and the like, a process of displaying a maintenance screen for making notification of a state of consumables of the MFP 100, a process of setting a setting value to a default setting value set in the MFP 100 and a process of displaying a document notification screen for making notification of the data stored in the HDD 115.

The deletion portion 261 deletes a piece of operation state information that has been stored for a predetermined time period or more since being stored from among pieces of operation state information stored by the operation state storage portion 251. Specifically, in the case where the predetermined time period has elapsed since date and time included in a piece of operation state information stored in the flash memory 203, the deletion portion 261 deletes the piece of operation state information from the flash memory 203.

The activation screen determination portion 255 receives position information from the position detection portion 259 and receives an execution state from the execution state detection portion 253. In response to switching of an execution state of a remote operation task from the non-current state to the current state, the activation screen determination portion 255 sets a position specified by the position information thereafter received from the position detection portion 259 as a current position. The activation screen determination portion 255 determines an activation screen based on the operation state information stored in the operation state storage portion 251 and the current position. The activation screen determination portion 255 outputs the determined activation screen to the operation screen display portion 257.

In response to switching of the execution state received from the execution state detection portion 253 from the non-current state to the current state, the operation screen display portion 257 controls the display unit 206 and displays an activation screen received from the activation screen determination portion 255 in the display unit 206.

In the case where the operation state information is not stored in the flash memory 203, or the case where the operation identification information included in the operation state information stored in the flash memory 203 indicates an operation different from an execution instruction operation, the activation screen determination portion 255 determines a predetermined operation screen corresponding to the current position as the activation screen. The execution instruction operation is an operation of instructing the MFP 100 to execute an image process.

The activation screen determination portion 255 stores a screen table that associates operation screens with positions relative to the MFP 100 in the flash memory 203. The screen table associates a position within a predetermined range with an operation screen for executing an image process that cannot be executed unless the MFP 100 is directly operated, and associates a position outside of the predetermined range with an operation screen for executing an image process that can be executed even in the case where the MFP 100 is not directly operated. The case where the image process that can be executed by the MFP 100 is the scan process, the image forming process, the transmission process and the data conversion process will be described here as an example. The image process that cannot be executed unless the MFP 100 is directly operated is a process that requires an operation of setting a physical medium in the MFP 100 in a stage before the image process is executed, and for example, is the scan process that requires an operation of placing a document before the process is executed by the MFP 100.

FIG. 6 is a diagram showing one example of the screen table. The screen table associates positions relative to the MFP 100 with the activation screens. In the diagram, as for the positions relative to the MFP 100, a position within the predetermined range from the MFP 100 is indicated by "CLOSE", and a position outside of the predetermined range from the MFP 100 is indicated by "FAR". Referring to FIG. 6, the screen table associates the relative position "CLOSE" from the MFP 100 with a "SCAN SETTING SCREEN" for executing the scan process. The scan process is an image process that requires an operation of placing a document on the automatic document feeder 120 and cannot be executed unless the MFP 100 is directly operated. Further, the screen table associates the relative position "FAR" from the MFP 100 with a "DOCUMENT SELECTION SCREEN" in which subject image data for the image forming process, the transmission process and the data conversion process can be selected. If the subject image data for the process is determined, the image forming process, the transmission process and the data conversion process can be executed regardless of a distance from the MFP 100, so that the image forming process, the transmission process and the data conversion process are the image processes that can be executed even in the case where the MFP 100 is not directly operated.

The screen to be associated with the relative position "FAR" from the MFP 100 is not limited to the document selection screen but may be another screen. Further, the position outside of the predetermined range, with reference to an operation history of the user, may be associated with an operation screen in which the execution instruction operation is frequently input. Similarly, the screen to be associated with the relative position "CLOSE" from the MFP 100 is not limited to the scan setting screen and may be another screen such as a facsimile transmission setting screen. Further, the relative position "CLOSE" from the MFP 100, with reference to the operation history of the user, may be associated with an operation screen in which the execution instruction operation is frequently input.

Returning to FIG. 5, in the case where operation state information is not stored in the flash memory 203, or the case where the operation identification information included in the operation state information stored in the flash memory 203 indicates an operation different from the execution instruction operation, the activation screen determination portion 255, with reference to the screen table, determines the scan setting screen as the activation screen if the current position is within the predetermined range. Further, the activation screen determination portion 255 determines the document selection screen as the activation screen if the current position is outside of the predetermined range. The case where the operation state information is not stored in the flash memory 203, or the case where the operation identification information indicated by the operation state information stored in the flash memory 203 indicates an operation different from the execution instruction operation is the case where a predetermined time period has elapsed since the remote operation of the MFP 100 by the user of the smartphone 200 with the smartphone 200, or the case where the user of the smartphone 200 allows the MFP 100 to execute a process other than an image process. The processes other than the image process are a process of displaying the maintenance screen or the status notification screen, and the like.

If the operation identification information included in the operation state information stored in the flash memory 203 indicates the execution instruction operation, and the position information included in the operation state information indicates a position outside of the predetermined range from the MFP 100, the activation screen determination screen 255 determines the status notification screen as the activation screen. The position information included in the operation state information indicates a position at a time point at which the execution instruction operation is input. The status notification screen is an operation screen for making notification of a state of a process executed by the MFP 100 and includes a state of a process in progress and a state of a process that has ended.

If the operation identification information included in the operation state information stored in the flash memory 203 indicates the execution instruction operation, and the position information included in the operation state information indicates a position within the predetermined range, the activation screen determination portion 255 determines a predetermined operation screen corresponding to the current position as the activation screen. Specifically, the activation screen determination portion 255, with reference to the screen table, determines the scan setting screen as the activation screen in the case where the current position is within the predetermined range, and determines the document selection screen as the activation screen in the case where the current position is a position outside of the predetermined range.

FIG. 7 is a diagram showing one example of a relationship among operations, distances from the MFP and activation screens. In FIG. 7, a time point at which an operation is input is indicated by "AT THE TIME OF OPERATION", and a time point at which the execution state is switched to the current state is indicated by "AT THE TIME OF ACTIVATION". Further, as for the positions relative to the MFP 100, a position within the predetermined range from the MFP 100 is indicated by "CLOSE", and a position outside of the predetermined range from the MFP 100 is indicated by "FAR". FIG. 7 shows the activation screens determined in association with the operation that is input "AT THE TIME OF OPERATION" at which an operation is input, a position relative to the MFP 100 at the time point at which the operation is output, and a position relative to the MFP 100 "AT THE TIME OF ACTIVATION" at which the execution state is switched to the current state.

Referring to FIG. 7, the state where the operation at the time of operation is "NO OPERATION" indicates that the operation state information is not stored in the flash memory 203, and a position relative to the MFP 100 at the time of operation does not exist. In the state where the operation at the time of operation is "NO OPERATION", if a relative position from the MFP 100 at the time of activation is a position "CLOSE" within the predetermined range from the MFP 100, the "SCAN SETTING SCREEN" is determined as the activation screen. If a relative position from the MFP 100 at the time of activation is a position "FAR" outside of the predetermined range from the MFP 100, the "DOCUMENT SELECTION SCREEN" is determined as the activation screen.

The state where the operation at the time of operation is an "OPERATION OTHER THAN EXECUTION INSTRUCTION OPERATION" indicates the case where an operation other than the execution instruction operation is accepted. In the state where the operation at the time of operation is the "OPERATION OTHER THAN EXECUTION INSTRUCTION OPERATION", regardless of a position relative to the MFP 100 at the time of operation, if a position at the time of activation is a position "CLOSE" within the predetermined range from the MFP 100, the "SCAN SETTING SCREEN" is determined as the activation screen. If a position at the time of activation is a position "FAR" outside of the predetermined range from the MFP 100, the "DOCUMENT SELECTION SCREEN" is determined as the activation screen.

In the case where the operation state information is not stored in the flash memory 203, or the case where the operation at the time of operation is different from the execution instruction operation, the user is likely to allow a process, different from a process executed earlier by the remote operation of the MFP 100, to be executed. Further, in the case where the user is positioned within the predetermined range from the MFP 100, the user is likely to perform a direct operation that requires placement of a document in the MFP 100 and the like. In the case where the user is positioned outside of the predetermined range from the MFP 100, the user is likely to perform an operation other than a direct operation and does not require the placement of a document in the MFP 100 and the like. Thus, in the case where the user is positioned within the predetermined range from the MFP 100, the "SCAN SETTING SCREEN" that is an operation screen for the direct operation is displayed as the activation screen. In the case where the user is positioned outside of the predetermined range from the MFP 100, the "DOCUMENT SELECTION SCREEN" that is an operation screen for the operation other than the direct operation is displayed as the activation screen. Thus, the user can perform settings for execution of the image process without switching operation screens, and this facilitates the user operations.

The state where the operation at the time of operation is the "EXECUTION INSTRUCTION OPERATION" indicates the case where the execution instruction operation is accepted. In the state where the operation at the time of operation is the "EXECUTION INSTRUCTION OPERATION", in the case where a position at the time of operation is a position "CLOSE" within the predetermined range from the MFP 100, and a position at the time of activation is a position "CLOSE" within the predetermined range from the MFP 100, the "SCAN SETTING SCREEN" is determined as the activation screen. In the case where a position at the time of operation is a position "CLOSE" within the predetermined range from the MFP 100, and a position at the time of activation is a position "FAR" outside of the predetermined range from the MFP 100, the "DOCUMENT SELECTION SCREEN" is determined as the activation screen.

In the case where the operation at the time of operation indicates the execution instruction operation, and a position at the time point at which the execution instruction operation is input is a position "CLOSE" within the predetermined range from the MFP 100, the user of the smartphone 200 is positioned within the predetermined range from the MFP 100. Therefore, this is the case where the user remotely operates the MFP 100 and inputs the execution instruction operation by using the smartphone 200 while being capable of directly operating the MFP 100. Because the user can directly operate the MFP 100 in a stage when inputting the execution instruction operation, the user can see a result of the execution of the process by the MFP 100 in accordance with the execution instruction operation. Therefore, in the case where the user allows the MFP 100 to execute a process in accordance with the execution instruction operation and then attempts to remotely operate the MFP 100 by using the smartphone 200, a predetermined operation screen corresponding to a position relative to the MFP 100 at that time point is displayed first as the activation screen, whereby the user is capable of immediately and remotely operating the MFP 100.

In the state where the operation at the time of operation is the "EXECUTION INSTRUCTION OPERATION", if a position at the time of operation is a position "FAR" outside of the predetermined range from the MFP 100, the "STATUS NOTIFICATION SCREEN" is determined as the activation screen regardless of a position at the time of activation.

The case where the operation at the time of operation indicates the execution instruction operation, and a position at a time point at which the execution instruction operation is input is a position "FAR" outside of the predetermined range from the MFP 100 is the case where the user of the smartphone 200 remotely operates the MFP 100 from a position outside of the predetermined range from the MFP 100 and inputs the execution instruction operation by using the smartphone 200, and allows the MFP 100 to execute a process in accordance with the execution instruction operation. In the stage when inputting the execution instruction operation, the user cannot be informed of a result of the execution of the process by the MFP 100 in accordance with the execution instruction operation. Then, in the case where the user attempts to remotely operate the MFP 100 by using the smartphone 200, the status notification screen is displayed first as the activation screen, whereby it is possible to notify the user whether the process executed by the MFP 100 in accordance with the execution instruction operation is in progress or has ended. For example, in the case where the user inputs an execution instruction operation of giving an instruction to execute the image forming process of forming an image of the image data stored in the HDD 115, when the user views the status notification screen at a position outside of the predetermined range from the MFP 100, if the image forming process has ended, the user can be informed of the time to move to a position where the MFP 100 is disposed in order to pick up sheets of paper on which images have been formed. Further, when the user views the status notification screen at a position within the predetermined range from the MFP 100, if the image forming process has ended, the user can be informed of the accumulation, of the sheets of paper on which images have been formed, in the MFP 100 due to the execution instruction operation, which the user has given an instruction to execute. Further, if the process has not ended, the user can be informed that he or she must wait until the image forming process ends. Further, the user can make an efficient use of the time for waiting and operate the MFP 100. For example, the user can perform settings for allowing the MFP 100 to execute another process.

Figure 8:
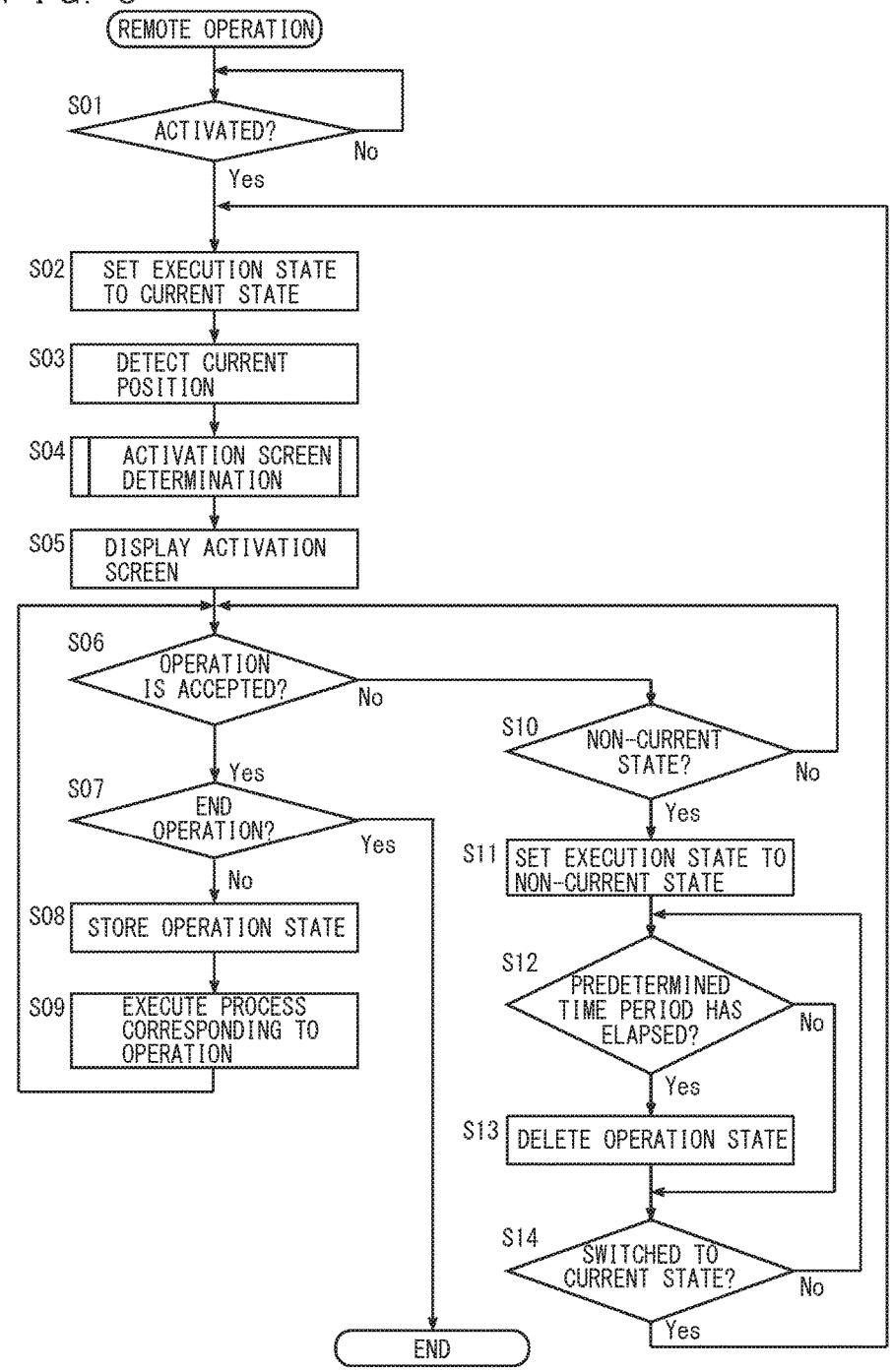
FIG. 8 is a flow chart showing one example of a flow of a remote operation process.

FIG. 8 is a flow chart showing a flow of a remote operation process. The remote operation process is a process executed by the CPU 201 in the case where the CPU 201 included in the smartphone 200 executes the remote operation program stored in the flash memory 203 or the CD-ROM 211A. Referring to FIG. 8, the CPU 201 determines whether the remote operation program has been activated (step S01). The process waits until the remote operation program is activated (NO in the step S01). When the remote operation program is activated (YES in the step S01), the process proceeds to the step S02. The CPU 201 does not actually execute the remote operation program, so that the one that determines whether the remote operation program is activated is the CPU 201 and not a task of executing the remote operation program by the CPU 201. As for the determination by the CPU 201 on whether the remote operation program is activated, when the operation unit 207 accepts an activation operation of the remote operation program by the user, the CPU 201 determines that the remote operation program is activated. For example, when a position, included in a menu screen displayed in the display unit 206 and located in an icon associated with a command of executing the remote operation program, is detected by the touch panel 207B, the activation operation of the remote operation program is accepted.

In the step S02, the execution state is set to the current state, and the process proceeds to the step S03. In the step S03, a current position is detected. The current position is a position relative to the MFP 100 at a time point at which the execution state is switched to the current state. The relative position is any of a position within the predetermined range from the MFP 100 and a position outside of the predetermined range from the MFP 100. For example, a distance from the MFP 100 is measured. If the measured distance is a predetermined distance or less, the current position is determined as a position within the predetermined range from the MFP 100. If the measured distance from the MFP 100 is larger than the predetermined distance, the current position is determined as a position outside of the predetermined range from the MFP 100. Further, in the case where the MFP 100 has a beacon terminal, when the CPU 201 receives a beacon signal from the beacon terminal, the current position is determined as a position within the predetermined range from the MFP 100. When the CPU 201 does not receive a beacon signal from the beacon terminal, the current position is determined as a position outside of the predetermined range from the MFP 100.

In the step S04, the CPU 201 executes an activation screen determination process, and the process proceeds to the step S05. While the details of the activation screen determination process will be described below, the activation screen determination process is a process of determining the activation screen from among the plurality of operation screens. In the step S05, the activation screen is displayed in the display unit 206, and the process proceeds to the step S06.

In the step S06, the CPU 201 determines whether an operation has been accepted. When a position in the operation screen is detected by the touch panel 207B, it is determined that an operation has been accepted. If the operation is accepted, an operation associated with a position in the operation screen detected by the touch panel 207B is specified, and the process proceeds to the step S07. If not, the process proceeds to the step S10. In the step S07, it is determined whether the accepted operation is an end operation of giving an instruction to end the remote operation program. If the accepted operation is the end operation, the process ends. If not, the process proceeds to the step S08. In the step S08, an operation state is stored in the flash memory 203, and the process proceeds to the step S09. The operation identification information for identifying the operation accepted in the step S06, the current position detected in the step S03 and the operation state information including the current date and time are stored in the flash memory 203. In the step S09, the process corresponding to the accepted operation is executed, and the process returns to the step S06.

In the step S10, whether the execution state has been switched to the non-current state is determined. In the case where the CPU 201 accepts a non-current switching operation by the user, or the case where the CPU 201 switches an execution state of another task that is set in the non-current state to the current state, it is determined that the execution state is switched to the non-current state. The non-current switching operation includes an operation of displaying a menu screen and an operation of temporarily ending the display in the display unit 206, for example. If the execution state is switched to the non-current state, the process proceeds to the step S11. If not, the process returns to the step S06.

In the step S11, the execution state is set to the non-current state, and the process proceeds to the step S12. In the step S12, it is determined whether a predetermined time period has elapsed since the storage of the operation state information in the flash memory 203 in the step S08. If the predetermined time period has elapsed since the storage of the operation state information, the process proceeds to the step S13. If not, the process proceeds to the step S14. The predetermined time period can be arbitrarily determined and may be a time period that can be determined as a time period that is not suitable for the user to continue remotely operating the MFP 100. In the step S13, the operation state information stored in the flash memory 203 is deleted, and the process proceeds to the step S14.

In the step S14, whether the execution state has been switched to the current state is determined. When the CPU 201 accepts a current switching operation by the user, it is determined that the execution state is switched to the current state. For example, in the case where a remote operation task is in the non-current state, the CPU 201 accepts the current switching operation in response to detection by the touch panel 207B of designation of an icon, associated with a command of executing the remote operation program, in the menu screen displayed in the display unit 206. If it is determined that the execution state is switched to the current state, the process returns to the step S02. If not, the process returns to the step S12.

Figure 9:
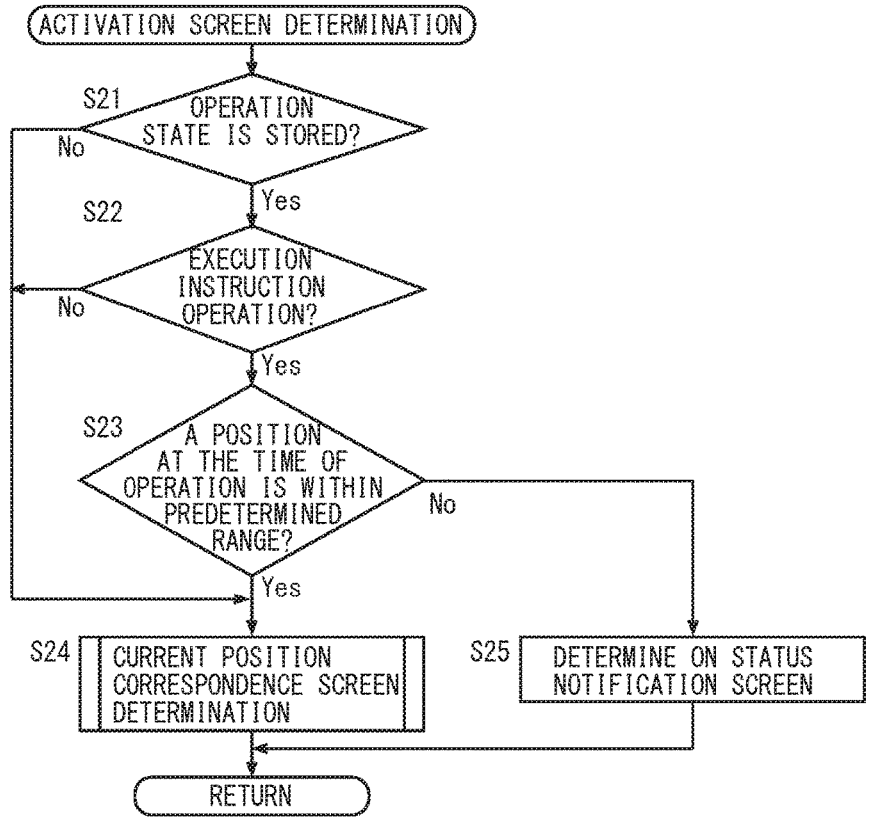
FIG. 9 is a flow chart showing one example of a flow of an activation screen determination process.

FIG. 9 is a flow chart showing one example of a flow of the activation screen determination process. The activation screen determination process is a process executed in the step S04 of the remote operation process. Referring to FIG. 9, the CPU 201 determines whether the operation state information is stored in the flash memory 203 (step S21). The operation state information is stored in the flash memory 203 in the step S08 of the remote operation process and deleted from the flash memory in the step S13. If the operation state information is stored in the flash memory 203, the process proceeds to the step S22. If not, the process proceeds to the step S24.

The case where the process proceeds to the step S22 is the case where it is determined in the step S21 that the operation state information is stored in the flash memory 203. In the step S22, it is determined whether an operation identified by the operation identification information included in the operation state information is the execution instruction operation. If the operation is the execution instruction operation, the process proceeds to the step S23. If not, the process proceeds to the step S24.

In the step S23, it is determined whether a position at the time of operation at which the execution instruction operation is accepted is within the predetermined range from the MFP 100. If the position included in the operation state information is within the predetermined range from the MFP 100, the process proceeds to the step S24. If a position included in the operation state information is outside of the predetermined range from the MFP 100, the process proceeds to the step S25. In the step S25, the status notification screen is determined as the activation screen, and the process returns to the remote operation process. In the step S24, a current position correspondence screen determination process is executed, and the process returns to the remote operation process.

Figure 10:
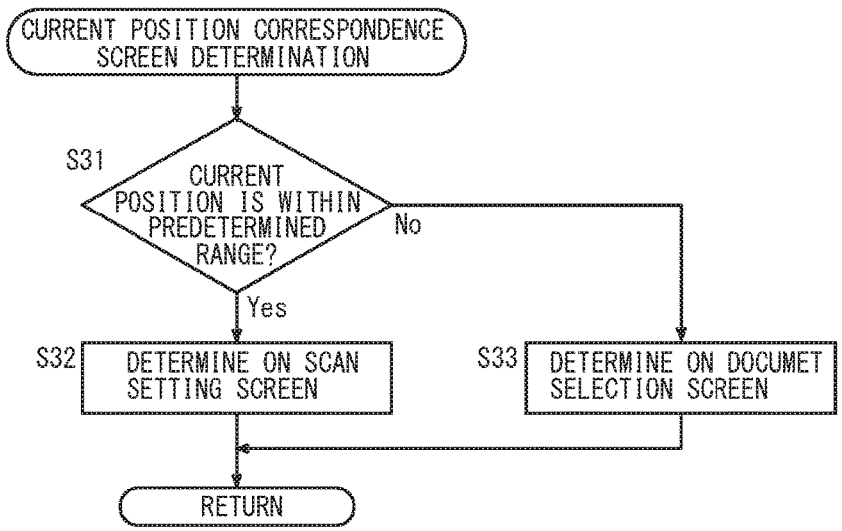
FIG. 10 is a diagram showing one example of a flow of a current screen correspondence screen determination process.

FIG. 10 is a diagram showing one example of a flow of the current position correspondence screen determination process. The current position correspondence screen determination process is a process executed in the step S24 of FIG. 9. Referring to FIG. 10, the CPU 201 determines whether the current position is within the predetermined range (step S31). If the current position detected in the step S03 of the remote operation process indicates a position within the predetermined range from the MFP 100, the process proceeds to the step S32. If the current position indicates a position outside of the predetermined range from the MFP 100, the process proceeds to the step S33.

In the step S32, the scan setting screen is determined as the activation screen, and the process returns to the activation screen determination process. The scan setting screen corresponding to a position "CLOSE" indicating a position within the predetermined range from the MFP 100 is determined as the activation screen with reference to the screen table stored in the flash memory 203. In the step S33, the document selection screen is determined as the activation screen, and the process returns to the activation screen determination process. The document selection screen corresponding to a position "FAR" indicating a position outside of the predetermined range from the MFP 100 is determined as the activation screen with reference to the screen table stored in the flash memory 203.

Modified Example

In a smartphone 200 in the modified example, the activation screen determination portion 255 of the CPU 201 shown in FIG. 5 is changed to an activation screen determination portion 255A. In the case where the operation state information is not stored in the flash memory 203, or the case where the operation state information stored in the flash memory 203 indicates an operation different from the execution instruction operation, the activation screen determination portion 255A in the modified example determines a predetermined operation screen corresponding to a current position as the activation screen with reference to the screen table. Specifically, in the case where the current position is within the predetermined range from the MFP 100, the scan setting screen is determined as the activation screen. In the case where the current position is outside of the predetermined range from the MFP 100, the document selection screen is determined as the activation screen.

If the operation identification information included in the operation state information stored in the flash memory 203 indicates a remotely conducted operation that is the execution instruction operation and does not require the direct operation of the MFP 100, and a position information included in the operation state information indicates a position outside of the predetermined range from the MFP 100, the activation screen determination portion 255A in the modified example determines the status notification screen as the activation screen. If the operation identification information included in the operation state information stored in the flash memory 203 indicates a remotely conducted operation that is the execution instruction operation and does not require the direct operation of the MFP 100, and a position included in the operation state information indicates a position outside of the predetermined range from the MFP 100, the activation screen determination portion 255A in the modified example determines a predetermined operation screen corresponding to the current position as the activation screen.

In the case where the operation identification information included in the operation state information stored in the flash memory 203 indicates a closely conducted operation that is the execution instruction operation and requires the direct operation of the MFP 100, the position information included in the operation state information indicates a position within the predetermined range from the MFP 100. In the case where the operation identification information included in the operation state information stored in the flash memory 203 indicates a closely conducted operation, if the current position is within the predetermined range from the MFP 100, the activation screen determination portion 255A in the modified example determines the predetermined scan setting screen corresponding to the current position as the activation screen. In the case where the operation identification information included in the operation state information stored in the flash memory 203 indicates a closely conducted operation, if the current position is outside of the predetermined range from the MFP 100, the activation screen determination portion 255A in the modified example determines the status notification screen as the activation screen.

FIG. 11 is a diagram showing one example of a relationship among operations, distances from the MFP and the activation screens in the modified example. In the FIG. 11, a time point at which an operation is input is indicated by "AT THE TIME OF OPERATION", and a time point at which the execution state is switched to the current state is indicated by "AT THE TIME OF ACTIVATION". Further, as for positions relative to the MFP 100, a position within the predetermine range from the MFP 100 is indicated by "CLOSE", and a position outside of the predetermined range from the MFP 100 is indicated by "FAR".

Referring to FIG. 11, in the state where an operation at the time of operation is "NO OPERATION", in the case where a position relative to the MFP 100 at the time of activation is a position "CLOSE" within the predetermined range from the MFP 100, the "SCAN SETTING SCREEN" is determined as the activation screen. In the case where a position relative to the MFP 100 at the time of activation is a position "FAR" outside of the predetermined range from the MFP 100, the "DOCUMENT SELECTION SCREEN" is determined as the activation screen.

In the state where an operation at the time of operation is an "OPERATION OTHER THAN EXECUTION INSTRUCTION OPERATION", in the case where a position at the time of activation is a position "CLOSE" within the predetermined range from the MFP 100, the "SCAN SETTING SCREEN" is determined as the activation screen regardless of a position relative to the MFP 100 at the time of operation. In the case where a position at the time of activation is a position "FAR" outside of the predetermined range from the MFP 100, the "DOCUMENT SETTING SCREEN" is determined as the activation screen regardless of a position relative to the MFP 100 at the time of operation.

The state where an operation at the time of operation is an "EXECUTION INSTRUCTION OPERATION (REMOTELY CONDUCTED OPERATION)" indicates the state where a remotely conducted operation that does not require the direct operation of the MFP 100 has been accepted. In the state where the operation at the time of operation is the "EXECUTION INSTRUCTION OPERATION (REMOTELY CONDUCTED OPERATION)", in the case where a position at the time of operation is a position "CLOSE" within the predetermined range from the MFP 100, and a position at the time of activation is a position "CLOSE" within the predetermined range from the MFP 100, the "SCAN SETTING SCREEN" is determined as the activation screen. In the case where the position at the time of operation is a position "CLOSE" within the predetermined range from the MFP 100, and the position at the time of activation is a position "FAR" outside of the predetermined range from the MFP 100, the "DOCUMENT SELECTION SCREEN" is determined as the activation screen. In the state where the operation at the time of operation is "EXECUTION INSTRUCTION OPERATION (REMOTELY CONDUCTED OPERATION), in the case where the position at the time of operation is a position "FAR" outside of the predetermined range from the MFP 100, the "STATUS NOTIFICATION SCREEN" is determined as the activation screen regardless of a position at the time of activation.

The state where the operation at the time of operation is the "EXECUTION INSTRUCTION OPERATION (CLOSELY CONDUCTED OPERATION)" indicates the state where the closely conducted operation that requires the direct operation of the MFP 100 has been accepted. A position relative to the MFP 100 at a time point at which the closely conducted operation is input is within the predetermined range from the MFP 100. In the state where the operation at the time of operation is the "EXECUTION INSTRUCTION OPERATION (CLOSELY CONDUCTED OPERATION)", in the case where a position at the time of activation is a position "CLOSE" within the predetermined range from the MFP 100, the "SCAN SETTING SCREEN" is determined as the activation screen. In the case where a position at the time of activation is a position "FAR" outside of the predetermined range from the MFP 100, the "STATUS NOTIFICATION SCREEN" is determined as the activation screen.

Specifically, the case where the closely conducted operation is accepted is the case where the user of the smartphone 200 is positioned within the predetermined range from the MFP 100, remotely operates the MFP 100 by using the smartphone 200 while being capable of directly operating the MFP 100, and inputs an execution instruction operation of giving an instruction to execute the scan process that requires the placement of a document in the MFP 100. After instructing the MFP 100 to execute the scan process, the user sometimes moves away from the MFP 100 to a position outside of the predetermined range from the MFP 100. Thus, when the user views the status notification screen at a position outside of the predetermined range from the MFP 100, if the scan process has ended, the user can be informed of the time to move to a position where the MFP 100 is disposed to pick up the document and allow the MFP 100 to execute another process for the image data acquired by execution of the scan process.

Further, after instructing the MFP 100 to execute the scan process, the user sometimes does not move away from the MFP 100, and the position relative to the MFP 100 is positioned within the predetermined range. In this case, the scan setting screen is displayed, so that the user can continuously perform settings for the execution of the scan process.

A CPU 201 included in the smartphone 200 in the modified example executes the remote operation process shown in FIG. 8 and the activation screen determination process shown in FIG. 9. However, in the step S24 of the activation screen determination process, the CPU 201 executes a current position correspondence screen determination process in the modified example.

FIG. 12 is a flow chart showing one example of a flow of the current position correspondence screen determination process in the modified example. Referring to FIG. 12, the CPU 201 determines whether a current position is within the predetermined range (step S31). If the current position detected in the step S03 of the remote operation process is within the predetermined range from the MFP 100, the process proceeds to the step S32. If the current position is outside of the predetermined range from the MFP 100, the process proceeds to the step S31A. In the step S32, the scan setting screen is determined as the activation screen, and the process returns to the activation screen determination process.

In the step S31A, the process branches depending on a type of the execution instruction operation. If the execution instruction operation is the remotely conducted operation, the process proceeds to the step S33. If the execution instruction operation is the closely conducted operation, the process proceeds to the step S34. In the step S33, the document selection screen is determined as the activation screen, and the process returns to the activation screen determination process. The document selection screen corresponding to a position "FAR" indicating a position outside of the predetermined range from the MFP 100 is determined as the activation screen with reference to the screen table stored in the flash memory 203. In the step S34, the status notification screen is determined as the activation screen, and the process returns to the activation screen determination process.

As described above, the smartphone 200 in the present embodiment functions as a remote operation device that remotely operates the MFP 100, stores the operation state information indicating an operation accepted in the current state, determines the activation screen based on a position relative to the MFP 100 detected after the activation at which the execution state is switched to the current state and the last stored operation state information, and displays the activation screen at the time of activation at which the execution state is switched to the current state. Therefore, the activation screen is determined based on the position relative to the MFP 100 after the activation and the last accepted operation, so that the operation screen suitable for remotely controlling the MFP 100 can be displayed at the time of activation.

Specifically, in the case where the last accepted operation is different from the execution instruction operation, the smartphone 200 determines a predetermined operation screen corresponding to a position relative to the MFP 100 at the time of activation as the activation screen. Thus, the activation screen suitable for the user to input the execution instruction operation can be displayed.

More specifically, if a position at the time point at which the last accepted execution instruction operation is accepted is outside of the predetermined range from the MFP 100, the smartphone 200 determines the status notification screen as the activation screen. If a position at the time point at which the last accepted execution instruction operation is accepted is within the predetermined range from the MFP 100, the smartphone 200 determines a predetermined operation screen corresponding to a position relative to the MFP 100 at the time of activation as the activation screen. Therefore, the user can be notified of a state of a process executed by the execution instruction operation that is accepted at a position outside of the predetermined range from the MFP 100. Further, in the case where the execution instruction operation is accepted within the predetermined range from the MFP 100, the user can see a state of a process executed by the MFP 100 in accordance with the execution instruction operation. Thus, a predetermined operation screen corresponding to a position relative to the MFP 100, rather than the status notification screen, is determined as the activation screen. Thus, the activation screen suitable for the user to input the execution instruction operation can be displayed.

Further, in the case where the last accepted execution instruction operation indicates the closely conducted operation that requires the direct operation of the image processing apparatus, the last accepted closely conducted operation is accepted at a position within the predetermined range from the MFP 100. If the position after the activation is outside of the predetermined range from the MFP 100, the smartphone 200 in the modified example determines the status notification screen as the activation screen. In the case where the closely conducted operation is accepted at a position within the predetermined range from the MFP 100, the user sometimes moves to a position outside of the predetermined range from the MFP 100 without checking a state of the scan process executed by the MFP 100 since the execution instruction operation of giving an instruction to execute the scan process is accepted. Therefore, in the case where a position at the time of activation is outside of the predetermined range from the MFP 100, the status notification screen is displayed. Thus, the user can be notified of a state of the process executed due to the execution instruction operation of giving an instruction to execute the scan process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote operation device capable of remotely operating an image processing apparatus, comprising:
   a display that displays an image;
   an operation acceptor that accepts an operation by a user; and a hardware processor, wherein the hardware processor includes
   an operation screen display configured to display any of a plurality of operation screens in the display,
   a detector configured to detect a position of the remote operation device relative to the image processing apparatus,
   an operation state storage configured to store an operation state indicating an operation accepted by the operation acceptor in a current state before the current state is switched to a non-current state, and an activation screen determiner configured to, based on a position of the remote operation device detected by the detector after activation at which the non-current state is switched to the current state and an operation state last stored by the operation state storage, determine an activation screen from among the plurality of operation screens, wherein the operation screen display is configured to, in response to the non-current state being switched to the current state, display the activation screen determined by the activation screen determiner in the display.

2. The remote operation device according to claim 1, wherein the activation screen determiner is configured to, in the case where the operation state last stored by the operation state storage indicates an operation different from an execution instruction operation of allowing the image processing apparatus to process an image, determine a predetermined operation screen corresponding to the position detected by the detector after the activation as an activation screen.

3. The remote operation device according to claim 1, wherein the operation state storage is configured to store a position, relative to the image processing apparatus in the current state where the operation indicated by the operation state is accepted, in association with the operation state, and the activation screen determiner is configured to, if the position associated with the operation state last stored by the operation state storage is outside of a predetermined range from the image processing apparatus, determine an operation screen for making notification of a state of a process executed by the image processing apparatus as an activation screen, and is configured to, if the position associated with the operation state last stored by the operation state storage is within the predetermined range from the image processing apparatus, determine a predetermined operation screen corresponding to the position detected by the detector after the activation as an activation screen.

4. The remote operation device according to claim 3, wherein the activation screen determiner is configured to, in the case where the operation state last stored by the operation state storage indicates an operation that requires a direct operation of the image processing apparatus, even when the position associated with the operation state last stored by the operation state storage is within the predetermined range from the image processing apparatus, if the position detected by the detector after the activation is outside of the predetermined range from the image processing apparatus, determine an operation screen for making notification of a state of a process executed by the image processing apparatus as an activation screen.

5. The remote operation device according to claim 1, wherein the current state is a state where any of the plurality of operation screens is displayable in the display, and the non-current state is a state where none of the plurality of operation screens is displayable in the display.

6. A remote operation method performed by a remote operation device, the remote operation device comprising:

a display that displays the image; and an operation acceptor that accepts an operation by a user, the remote operation method including:

an operation screen display step of displaying any of a plurality of operation screens in the display;

a detection step of detecting a position of the remote operation device relative to the image processing apparatus;

an operation state storage step of storing an operation state indicating an operation accepted by the operation acceptor in a current state before the current state is switched to a non-current state; and an activation screen determination step of, based on a position of the remote operation device detected in the detection step after activation at which the non-current state is switched to the current state and an operation state last stored in the operation state storage step, determining an activation screen from among the plurality of operation screens, wherein the operation screen display step includes a step of, in response to the non-current state being switched to the current state, displaying the activation screen determined in the activation screen determination step in the display.

7. The remote operation method according to claim 6, wherein the activation screen determination step includes a step of, in the case where the operation state last stored in the operation state storage step indicates an operation different from an execution instruction operation of allowing the image processing apparatus to process an image, determining a predetermined operation screen corresponding to the position detected in the detection step after the activation as an activation screen.

8. The remote operation method according to claim 6, wherein the operation state storage step includes a step of storing a position, relative to the image processing apparatus in the current state where the operation indicated by the operation state is accepted, in association with the operation state, and the activation screen determination step includes a step of, if the position associated with the operation state last stored in the operation state storage step is outside of a predetermined range from the image processing apparatus, determining an operation screen for making notification of a state of a process executed by the image processing apparatus as an activation screen, and a step of, if the position associated with the operation state last stored in the operation state storage step is within the predetermined range from the image processing apparatus, determining a predetermined operation screen corresponding to the position detected in the detection step after the activation as an activation screen.

9. The remote operation method according to claim 8, wherein the activation screen determination step includes a step of, in the case where the operation state last stored in the operation state storage step indicates an operation that requires a direct operation of the image processing apparatus, even when the position associated with the operation state last stored in the operation state storage step is within the predetermined range from the image processing apparatus, if the position detected in the detection step after the activation is outside of the predetermined range from the image processing apparatus, determining an operation screen for making notification of a state of a process executed by the image processing apparatus as an activation screen.

10. The remote operation method according to claim 6, wherein
the current state is a state where any of the plurality of operation screens is displayable in the display, and the non-current state is a state where none of the plurality of operation screens is displayable in the display.

11. A non-transitory computer-readable recording medium encoded with a remote operation program,
a remote operation device comprising:
a display that displays image; and an operation acceptor that accepts an operation by a user, the remote operation program causing a computer that controls the remote operation device to execute:
an operation screen display step of displaying any of a plurality of operation, screens in the display;
a detection step of detecting a position of the remote operation device relative to the image processing apparatus;
an operation state storage step of storing an operation state indicating an operation accepted by the operation acceptor in a current state before the current state is switched to a non-current state; and an activation screen determination step of, based on a position of the remote operation device detected in the detection step after activation at which the non-current state is switched to the current state and an operation state last stored in the operation state storage step, determining an activation screen from among the plurality of operation screens, wherein
the operation screen display step includes a step of, in response to the non-current state being switched to the current state, displaying the activation screen determined in the activation screen determination step in the display.

12. The remote operation program according to claim 11, wherein the activation screen determination step includes a step of, in the case
where the operation state last stored in the operation state storage step indicates an Operation different from an execution instruction operation of allowing the image processing apparatus to process an image, determining a predetermined operation screen corresponding to the position detected in the detection step after the activation as an activation screen.

13. The remote operation program according to claim 11, wherein the operation state storage step includes a step of storing a position,
relative to the image processing apparatus in the current state where the operation indicated by the operation state is accepted, in association with the operation state, and
the activation screen determination step includes
a step of, if the position associated with the operation state last stored in the operation state storage step is outside of a predetermined range from the image processing apparatus, determining an operation screen for making notification, of a state of a process executed by the image processing apparatus as an activation screen, and
a step of, if the position associated with the operation state last stored in the operation state storage step is within the predetermined range from the image processing apparatus, determining a predetermined operation screen corresponding to the position detected in the detection step after the activation as an activation screen.

14. The remote operation program according to claim 13, wherein
the activation screen determination step includes a step of, in the case where the operation state last stored in the operation state storage step indicates an operation that requires a direct operation of the image processing apparatus, even when the position associated with the operation state last stored in the operation state storage step is within the predetermined range from the image processing apparatus, if the position detected in the detection step after the activation is outside of the predetermined range from the image processing apparatus, determining an operation screen for making notification of a state of a process executed by the image processing apparatus as an activation screen.

15. The remote operation program according to claim 11, wherein
the current state is a state where any of the plurality of operation screens is displayable in the display, and the non-current state is a state where none of the plurality of operation screens is displayable in the display.

* * * * *